(12) United States Patent
Higashiguchi et al.

(10) Patent No.: US 9,518,357 B2
(45) Date of Patent: Dec. 13, 2016

(54) MARK-FABRIC MATERIAL AND MARK FORMING METHOD

(71) Applicant: HOULAISHA CO., LTD., Sumida-ku, Tokyo (JP)

(72) Inventors: Shigeji Higashiguchi, Tokyo (JP); Shinichi Nagai, Tokyo (JP)

(73) Assignee: HOULAISHA CO., LTD., Tokyo (JP)

( * ) Notice: Subject to any disclaimer, the term of this patent is extended or adjusted under 35 U.S.C. 154(b) by 60 days.

(21) Appl. No.: 14/408,958

(22) PCT Filed: Jun. 14, 2013

(86) PCT No.: PCT/JP2013/066520
§ 371 (c)(1),
(2) Date: Dec. 18, 2014

(87) PCT Pub. No.: WO2013/191111
PCT Pub. Date: Dec. 27, 2013

(65) Prior Publication Data
US 2015/0275424 A1    Oct. 1, 2015

(30) Foreign Application Priority Data

Jun. 19, 2012  (JP) .................... 2012-137752

(51) Int. Cl.
| D06P 5/00 | (2006.01) |
| D06P 5/28 | (2006.01) |
| D06Q 1/14 | (2006.01) |
| B32B 5/02 | (2006.01) |
| B32B 7/06 | (2006.01) |
| B32B 7/12 | (2006.01) |
| B32B 27/10 | (2006.01) |
| B32B 27/12 | (2006.01) |
| D06P 3/52 | (2006.01) |
| D06Q 1/12 | (2006.01) |

(52) U.S. Cl.
CPC ............... *D06P 5/004* (2013.01); *B32B 5/022* (2013.01); *B32B 5/026* (2013.01); *B32B 7/06* (2013.01); *B32B 7/12* (2013.01); *B32B 27/10* (2013.01); *B32B 27/12* (2013.01); *D06P 3/52* (2013.01); *D06Q 1/12* (2013.01); *D06Q 1/14* (2013.01); *B32B 2262/0276* (2013.01); *B32B 2307/718* (2013.01); *B32B 2307/748* (2013.01); *B32B 2437/00* (2013.01); *D10B 2331/04* (2013.01); *D10B 2401/00* (2013.01); *D10B 2501/00* (2013.01); *D10B 2507/00* (2013.01); *Y10T 428/1476* (2015.01)

(58) Field of Classification Search
CPC ............... D06Q 1/14; D06Q 1/12; D06P 3/52; D06P 5/004; B32B 5/022; B32B 5/026; B32B 7/12; B32B 27/12; B32B 2262/0276; B32B 2437/00; B32B 2307/718; D10B 2331/04; D10B 2401/00; Y10T 428/1476
USPC ........................................................... 8/471
See application file for complete search history.

(56) References Cited

U.S. PATENT DOCUMENTS

2007/0289712 A1* 12/2007 Higashiguchi ........... D06H 1/04
156/542

FOREIGN PATENT DOCUMENTS

JP  2006-322129 A  11/2006

* cited by examiner

*Primary Examiner* — Eisa Elhilo
(74) *Attorney, Agent, or Firm* — Solaris Intellectual Property Group, PLLC

(57) ABSTRACT

A mark-fabric material includes a mark-fabric including, in the following sequence, microfibers, an adhesive layer including a thermoplastic resin having a melt flow rate of 100 g/10 min or less, and a release sheet.

18 Claims, 4 Drawing Sheets

MARK-FABRIC MATERIAL AND MARK FORMING METHOD

TECHNICAL FIELD

The present invention aims to provide a mark-fabric material that enables transferring, onto a fabric, color, motif, design etc. that was printed onto a transfer paper by using the transfer paper printed with the color, motif, design etc. using a sublimating dye, to form a mark-fabric. The invention also aims to provide a mark forming method employing the same.

BACKGROUND ART

Numerous methods are in use, such as for sports uniforms, for adhering a mark (badge) printed with a jersey number, a desired design etc. onto the uniform fabric. Hitherto, in order to form such marks, often mark-fabric materials are used that have been provided with a hot melt adhesive layer on a mark-fabric such as a woven fabric, knitted fabric, or non-woven fabric, printed with the desired color, design, motif, or the like using silk screen printing or the like. Note that "mark-fabric material" below denotes a material with at least an adhesive layer applied to a mark-fabric prior to applying the motif, design etc. onto the mark-fabric. References to a "marked-fabric" means a fabric in which the motif, design etc. have been applied to a mark-fabric material. Namely, it is possible to form a mark (badge) by cutting a marked-fabric, which has a motif etc. applied onto a mark-fabric material, into a desired shape, and adhering this to a uniform etc.

Development of transfer papers printed with color, motif, design etc. using a sublimating dye has recently progressed as technology for printing motifs etc. onto mark-fabric materials. Currently, even in the mark industry, alongside conventional silk screen printing methods and the like, technology is becoming widespread in which a motif, a design etc. is transferred onto a mark-fabric material using transfer paper printed with a sublimating dye.

Explanation follows, using FIG. 3, regarding an example of technology in which a mark-fabric material is produced using transfer paper. A cloth suited to transfer of a sublimating dye by sublimation may be employed as a mark-fabric 6 configuring a mark-fabric material 11. Typical examples of such cloths include plain white woven fabrics, knitted fabrics, non-woven fabrics, etc. made from polyester fiber or the like. In order to produce the mark-fabric material 11 with the configuration illustrated in FIG. 3, first a composite fabric 8 is produced using the mark-fabric 6 and a non-woven fabric 7 coated with a temporary adhesive 7'. Specifically, a composite fabric 8 backed by the non-woven fabric 7 can be produced by superimposing the non-woven fabric 7 on the mark-fabric 6, with the temporary adhesive 7' facing toward the mark-fabric 6, and performing thermal pressing using a heat press. A printed face of the transfer paper is then pressed onto the front face of the plain white mark-fabric 6 of the composite fabric 8, thermal pressing is performed using a heat press or the like, the sublimation dye of the color, motif, design etc. printed onto the transfer paper using sublimating dye is caused to sublimate, and the color, motif, or design formed from the sublimated dye are transferred onto the face of the plain white mark-fabric 6. The thermal pressing conditions during transfer of the color, motif, or design (sublimation transfer) are usually set such that the heating temperature is from approximately 180° C. to approximately 210° C., the pressure is from approximately 1 g per square centimeter to 2000 g per square centimeter, and the thermal pressing time is from approximately 30 seconds to approximately 90 seconds.

Next, according to ordinary methods, an adhesive layer 9 is formed on the non-woven fabric 7 face of the composite fabric 8 for which the above operations have been completed using a hot melt thermoplastic synthetic resin exhibiting a function of transfer-adhering a mark onto a transfer target such as a uniform, and a release sheet 10 is stuck onto the surface of the adhesive layer 9 to yield a material that is a mark-fabric material 11 configured as illustrated in FIG. 3. The melting point of the adhesive layer 9 is usually adjusted so as to be approximately 150° C., the thermal pressing time is usually set at approximately 30 seconds, and the pressure is usually adjusted to approximately 200 g per square centimeter. During production of the mark from the mark-fabric material 11 produced by the above means, a desired shape is cut from the mark-fabric material 11 to yield a mark 12 like that illustrated in FIG. 4.

For the above mark-fabric material, the mark-fabric material 11 cannot be produced by first taking a cloth selected from the group consisting of plain white woven fabrics, knitted fabrics, non-woven fabrics, etc. made from polyester fiber as the mark-fabric 6, then, with the non-woven fabric 7 coated with the temporary adhesive 7' backing the mark-fabric 6 to form the composite fabric 8, forming the adhesive layer 9 on the back face of the composite fabric 8 to thereby produce the mark-fabric material, and then subsequently producing the mark-fabric material 11 transferred with the color, motif, or design by the sublimating dye using the transfer paper onto the cloth that forms the mark-fabric 6 of the composite fabric 8 configuring the mark-fabric material. This is because not only are the temperature to sublimate the sublimating dye printed onto the transfer paper onto the mark-fabric 6 for forming a marked-fabric material to transfer the color, motif, or design onto a mark-fabric of the mark-fabric 6, and the melting point of the adhesive layer 9 formed on the mark-fabric material are different from each other, but the melting of the adhesive layer 9 would proceed first during the transfer operation due to differences in press pressure and pressing time, and the melted resin of the adhesive layer 9 would pass through the non-woven fabric 7 configuring the composite fabric 8, seep out onto the front face of the mark-fabric 6, and cause sublimation transfer defects due to a membrane forming on the surface of the mark-fabric 6 by the melted resin.

Moreover, the following defects arise when: a plain white woven fabric, knitted fabric, non-woven fabric or the like made from polyester fiber currently employed in the mark (badge) industry is employed as the mark-fabric 6; the non-woven fabric 7 coated with the temporary adhesive 7' is employed backing the mark-fabric 6 to form the composite fabric 8; then after using the transfer paper to transfer the color, motif, or design onto the mark-fabric 6 of the composite fabric 8, the adhesive layer 9 is formed on the non-woven fabric 7 of the composite fabric 8, and a mark 12, illustrated in FIG. 4, is produced by punching out from the mark-fabric material 11 configured as illustrated in FIG. 3; and the mark is adhered to a uniform or the like by thermal pressing by an ordinary method. Namely, although there is strong adhesion between the uniform and the non-woven fabric 7 of the composite fabric 8 configuring the mark, there is poor fastness to washing of the mark 12 adhered to a uniform or the like, and what is referred to as a peeling defect arises during washing, due to the non-woven fabric 7 being temporarily adhered to the mark-fabric 6 by the temporary adhesive 7'. Moreover, a mark is produced with the defect of having poor rub resistance. Moreover, after transferring the color, motif, or design onto the mark-fabric 6 of the composite fabric 8 using the transfer paper, if an attempt is made to form the adhesive layer 9 after peeling off the non-woven fabric 7, a defect arises of the color, motif, or design transferred using the transfer paper distorting due to the operation to peel off the mark-fabric 6.

Moreover, as a means to produce the composite fabric 8 so as to alleviate the defects described above, consideration might be given to: producing the composite fabric 8 thickly coated with the temporary adhesive 7' in an attempt to strongly adhere the non-woven fabric 7, disposed behind the mark-fabric 6, to the mark-fabric 6; producing the mark-fabric material 11 by forming the adhesive layer 9 on the non-woven fabric 7 of the composite fabric 8; punching out the mark 12 from the mark-fabric material 11; and adhering the mark 12 to a uniform or the like using thermal pressing in accordance with ordinary methods. However, since in such a mark-fabric material the synthetic resin configuring the temporary adhesive 7' results in a thick layer, the synthetic resin would melt and seep through both to the front face of the mark-fabric 6 and the back face of the non-woven fabric 7, and a membrane would be formed due to the melted synthetic resin on the surface of the mark-fabric 6. As a result, defects would arise that the mark-fabric material produced using the composite fabric 8 with the thick temporary adhesive 7', and marks produced from this mark-fabric material would not be a saleable product.

As a mark-fabric material mitigating the above issues, a mark-fabric material is described in which: a plain white cloth produced using fibers made from constituent components having an affinity to a sublimating dye is employed as a mark-fabric to configure a mark-fabric material; an intermediate layer made from a synthetic resin set with a softening temperature at a higher temperature than the sublimation temperature of the sublimating dye is formed on the back face of the mark-fabric that is the cloth described above by a synthetic resin having affinity to constituent components of a cloth component of the mark-fabric that is the cloth described above; and a transfer adhesive layer (adhesive layer) made from a hot melt thermoplastic synthetic resin is formed on the surface of the intermediate layer, and release paper is stuck onto the surface of the transfer adhesive layer (see Patent Document 1).

PATENT DOCUMENTS

Patent Document 1 Japanese Patent Application Laid-Open (JP-A) 2006-322129

SUMMARY OF INVENTION

Technical Problem

In order to eliminate defects of marks produced from conventional mark-fabric materials using the above composite fabrics currently produced by the industry, the invention uses addresses production of a mark-fabric material capable of forming of a desired color, motif, or design on a cloth serving as the mark-fabric by using transfer paper printed with a sublimating dye, and production of a marked-fabric therefrom.

When an intermediate layer made from a synthetic resin having a softening temperature higher than the sublimation temperature of the sublimating dye is formed on a mark-fabric material used in sublimation transfer, as described above, it is possible to suppress the transfer adhesive layer from melting due to heat and pressure during transfer and seeping through to the mark-fabric front face (pattern transfer front face) during pattern formation by sublimation transfer. Namely, a fabric having fibers with a fiber diameter exceeding 10 μm is generally employed to form mark-fabric. Therefore, it is difficult to suppress the transfer adhesive layer from seeping through to the front face of the mark-fabric in cases in which there is no intermediate layer, since there are large gaps present, such as at stitches. However, in cases in which the intermediate layer is formed in the mark-fabric, when, for example, a method such as coating is employed, sometimes pinholes and minute fissures etc. develop in the intermediate layer due to various causes such as variation in fabric stitching density, weave undulations, and impacts during handling. Although these pinholes are small, at from approximately 10 μm to approximately 200 μm in diameter, when numerous sometimes around 20 arise per 1 $cm^2$ can develop.

When such pinholes, minute fissures etc. develop in the intermediate layer, the melted transfer adhesive layer sometimes passes through these pinholes during sublimation transfer of the pattern, and seeps through to the front face of the mark-fabric even when the intermediate layer is formed as described above. When the resin or the like seeps through to the front face of the mark-fabric, transfer defects arise such as paper tearing when peeling the release paper of the sublimation transfer sheet from the mark-fabric material after transfer due to the seeped out resin adhering the release paper to the front face of the mark-fabric.

A separate manufacturing process is moreover required in order to form the intermediate layer. Therefore, provision of a mark-fabric material is desired that, without forming the intermediate layer, is able to suppress the transfer adhesive layer from melting due to heat and pressure during pattern formation by sublimation transfer, and seeping out to the front face of the mark-fabric (the pattern transfer front face).

An object of the invention is to provide a mark-fabric material that prevents an adhesive layer from seeping through to the front face of the mark-fabric at heating and applying pressure, and to provide a mark forming method employing the same.

Solution to Problem

<1> A mark-fabric material, comprising, in the following sequence:
a mark-fabric comprising microfibers;
an adhesive layer including a thermoplastic resin having a melt flow rate of 100 g/10 min or less; and
a release sheet.

<2> The mark-fabric material of <1>, wherein the microfibers comprise polyester.

<3> The mark-fabric material of <1> or <2>, wherein the mark-fabric is a 100% polyester woven fabric, knitted fabric, or non-woven fabric.

<4> The mark-fabric material of any one of <1> to <3>, wherein the weight of the mark-fabric is from 100 $g/m^2$ to 250 $g/m^2$.

<5> The mark-fabric material of any one of <1> to <4>, wherein the mark-fabric is a white color.

<6> A mark forming method, comprising:
forming a pattern with a sublimating dye on a mark-fabric material including, in the following sequence, a mark-fabric comprising microfibers, an adhesive layer including a thermoplastic resin having a melt flow rate of 100 g/10 min or less, and a release sheet, by sublimation transfer using sublimation conditions of from 185° C. to 210° C. and from 30 seconds to 90 seconds, <7> The mark forming method of <6>, wherein the microfibers comprise polyester.

<8> The mark forming method of <6> or <7>, wherein the mark-fabric is a 100% polyester woven fabric, knitted fabric, or non-woven fabric.

<9> The mark forming method of any one of <6> to <8>, wherein the weight of the mark-fabric is from 100 g/m² to 250 g/m².

<10> The mark forming method of any one of <6> to <9>, wherein the mark-fabric is a white color.

Effects of Invention

The invention can provide a mark-fabric material that prevents an adhesive layer from seeping through to the front face of the mark-fabric at heating and applying pressure, and to provide a mark forming method employing the same.

DESCRIPTION OF EMBODIMENTS

Mark-Fabric Material

Figure 1:
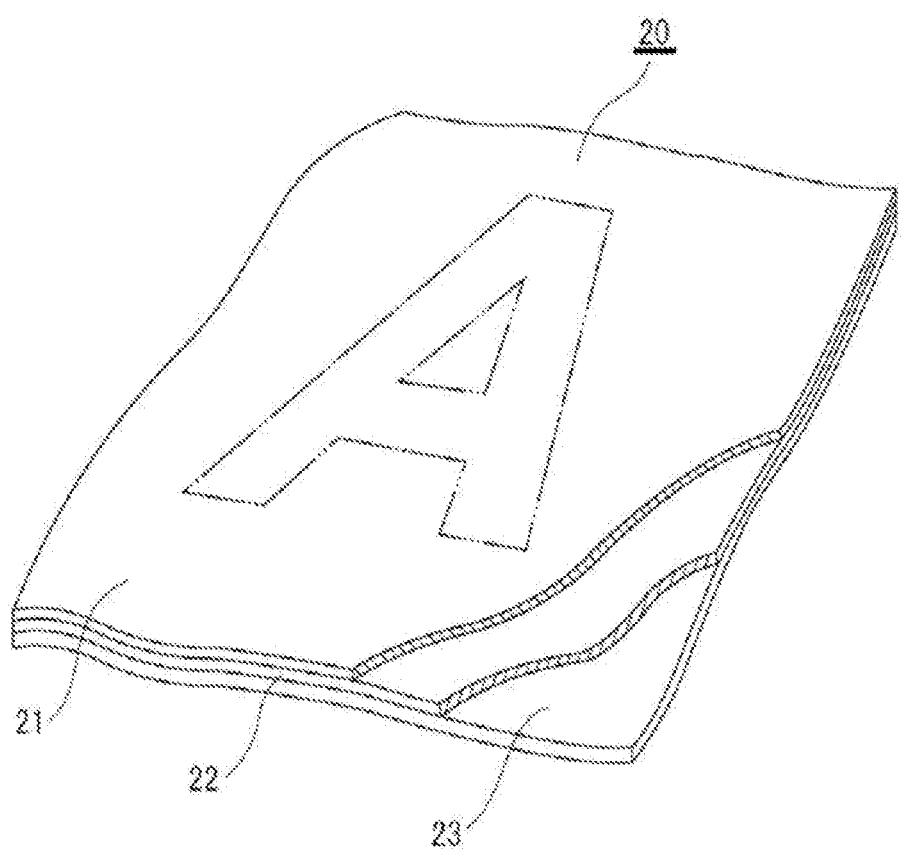
FIG. 1 is a partially cut-away perspective view of a mark-fabric material according to the invention.

A mark-fabric material of the invention includes, in the following sequence, a mark-fabric including microfibers, an adhesive layer that includes a thermoplastic resin having a melt flow rate of 100 g/10 min or less, and a release sheet.

The mark-fabric material of the invention is particularly preferably employed in an application in which a pattern formed of a sublimating dye is transferred to form a mark. Namely, the mark-fabric material of the invention enables a pattern formed of a sublimating dye to be sublimation transferred to a mark-fabric front face using heat and pressure, with a pre-existing adhesive layer for sticking to clothing such as uniforms and various other target items. The mark-fabric material of the invention is capable of greatly reducing the risk of a design formed of sublimating dye being damaged or distorted in subsequent processing treatment or the like since seeping of the adhesive layer through onto the mark-fabric during sublimation transfer does not occur, and due to separate formation of an adhesive layer or the like after forming a design etc. being unnecessary. Moreover, after forming the design etc. of the mark, and after the marked-fabric has been cut to a desired shape if necessary, the release sheet is peeled off, the mark-fabric is superimposed on the uniform or the like, and the mark can be stuck to the target object using a heat press or the like.

The mark-fabric material of the invention includes a mark-fabric including microfibers, and an adhesive layer (hot melt layer) that includes a thermoplastic resin having a melt flow rate of 100 g/10 min or less. This thereby enables the thermoplastic resin configuring the adhesive layer to be suppressed from melting and seeping through to the mark-fabric front face when the mark-fabric material that forms the pattern using the sublimating dye is heated and pressed, even without an intermediate layer. Disposing a release sheet onto the opposite side to the side on which the mark-fabric of the adhesive layer is provided (backing) is also enabled. This thereby enables the thermoplastic resin to be prevented from adhering elsewhere, even if the thermoplastic resin forming the adhesive layer melts during sublimation transfer.

Mark-Fabric

A fabric including microfibers may be employed as the mark-fabric configuring the mark-fabric material. Herein, "microfibers" means ultrafine fibers, and fibers having a fiber diameter of 10 μm or less are preferable; commercially available fibers ordinarily described as microfibers may be suitably employed therefor. Sometimes it is not possible to effectively suppress the adhesive layer from seeping through to the fabric surface when the fiber diameter of the microfibers employed in the mark-fabric exceeds 10 μm. A fabric employing the microfibers refers to a cloth made from the microfibers. A fiber diameter of from 0.5 μm to 10 μm is preferable, from 0.5 μm to 8 μm is more preferable, and from 0.5 μm to 5 μm is particularly preferable. Provided the mark-fabric employing the microfibers is a cloth having at least sufficient heat resistance to withstand the transfer conditions of the sublimating dye, there are no particular limitations thereto. The cloth is preferably a cloth made from a woven fabric, a knitted fabric, or a non-woven fabric produced from microfibers made from a constituent component having affinity with the sublimating dye. Typical examples of microfibers made from a constituent component having affinity with the sublimating dye include polyester fibers or NYLON fibers, and mixed fibers thereof. Of these, the fabric employing the microfibers is preferably a 100% polyester woven fabric, knitted fabric, or non-woven fabric from the viewpoint of strong bonding of the sublimating dye to produce vividness of the colors, motifs, and designs by the sublimated dye transferred from transfer paper. The color of the cloth configuring the mark-fabric is also not particularly limited, and may be suitably chosen according to purpose. A plain white (white-colored) cloth is preferably employed in consideration of color developability and general applicability of the mark.

The weight of the mark-fabric is preferably from 100 g/m² to 250 g/m², is more preferably from 150 g/m² to 195 g/m², and is particularly preferably from 180 g/m² to 190 g/m² from the point of view of effectively suppressing the adhesive layer from seeping out during transfer of the sublimating dye. The thickness of the mark-fabric is preferably from 200 μm to 600 μm, is more preferably from 350 μm to 550 μm, and is particularly preferably from 400 μm to 500 μm from the viewpoint of effectively suppressing seeping out of the adhesive layer during sublimating dye transfer.

A known material, such as a commercially available product, appropriately selected in consideration of the various above conditions may be employed as the fabric including microfibers.

Adhesive Layer

The adhesive layer of the invention is a so-called hot melt layer employed in order to adhere the mark-fabric to a fabric such as a uniform. The adhesive layer of the invention includes a thermoplastic resin having a melt flow rate of 100 g/10 min or lower. The adhesive layer may be provided directly on the mark-fabric, and an intermediate layer employing a desired resin or the like may be separately provided between the mark-fabric and the adhesive layer. The adhesive layer is preferably provided directly on the mark-fabric in consideration of simplicity of manufacturing processes, the flexibility of the formed mark, and the like. Moreover, the adhesive layer may be provided on a treated surface after a performing surface treatment, such as calendaring treatment, to the mark-fabric.

In the present specification, "melt flow rate" is synonymous with melt index (MI), and refers to a value measured at a temperature of 190° C., and a load of 8.76 kg, in accordance with JIS-K7210 (1999) B. If the melt flow rate of the thermoplastic resin configuring the adhesive layer exceeds 100 g/10 min, the melted thermoplastic resin sometimes seeps out onto the mark-fabric front face when the sublimating dye is sublimation transferred using sublimation conditions of, for example, temperature: 185° C., pressure: 300 g/m$^2$, time: 60 seconds. The melt flow rate of the thermoplastic resin is preferably from 60 g/10 min to 100 g/10 min, is more preferably from 65 g/10 min to 95 g/10 min, and is particularly preferably from 70 g/10 min to 90 g/10 min in consideration of efficiency in formation of the adhesive layer such as coating and shaping. The melt flow rate may be measured several times for the target thermoplastic resin and an average value determined therefor, in accordance with JIS-K7210. Although the adjustment method of melt flow rate is not particularly limited, the viscosity may be increased (the melt flow rate decreased) by increasing a molecular weight of the polymer.

The softening temperature of the thermoplastic resin employed in the adhesive layer is preferably 170° C. or lower. Herein, "softening temperature" means the Vicat softening temperature as defined by JIS K-7206 (1999). The sticking conditions such as to uniforms and fabrics of shirts by ordinary producers are approximately a temperature of from 130° C. to 170° C., a pressure of from 100 g/cm$^2$ to 1000 g/cm$^2$, and a time of from 20 seconds to 60 seconds. If the softening temperature of the adhesive layer exceeds 170° C., heating above these sticking conditions is required, and in addition to increased production costs, product quality of the sticking targets such as uniforms is liable to decrease. Although the softening temperature of the thermoplastic resin may be appropriately selected according to sticking conditions based on the sticking target, the maximum softening temperature is preferably 160° C. or lower, and is more preferably 150° C. or lower. The specific temperature range of the softening temperature is preferably from 70° C. to 170° C., and is more preferably from 80° C. to 150° C. from the viewpoints of storage stability of the mark-fabric material before sticking, fastness against washing and rubbing resistance of the mark-fabric material after sticking, and in consideration of the sticking conditions of ordinary marks.

A commercially available resin may be suitably employed provided that the thermoplastic resin that forms the adhesive layer fulfills the above melt flow rate conditions; and the thermoplastic resin is preferably a hot melt-type thermoplastic synthetic resin having affinity with the microfibers included in the mark-fabric. Examples of such thermoplastic resins include thermoplastic polyurethanes prepared such that the desired conditions for the softening temperature and the viscosity are met. For example, SHM103-PUB (softening temperature of 90° C., average value of melt flow rate of 78.71 g/10 min (under conditions of 190° C. and 8.76 kg)) may be employed as such a thermoplastic polyurethane.

The adhesive layer may be formed on the mark-fabric by a method of laminating or coating a film made from the thermoplastic resin. The layer thickness of the adhesive layer is not particularly limited, and may be selected as appropriate for the desired purpose; and the layer thickness is preferably from 10 μm to 150 μm, and is more preferably from 50 μm to 100 μm, from the viewpoints of sticking performance to the target object, fastness against washing, and rubbing resistance.

Release Sheet

The release sheet is a sheet-shaped material backing the back face of the adhesive layer (the opposite face to the adhesive layer face of the mark-fabric), and is peelable from the thermoplastic resin configuring the adhesive layer. In the mark-fabric material of the invention, provision of the release sheet enables the thermoplastic resin that is melted by heat and pressure during transfer of the sublimating dye to the mark-fabric material before sticking, to be suppressed from sticking elsewhere. The release sheet may be appropriately selected according to the type of thermoplastic resin material employed in the adhesive layer from commercially available release sheets such as release papers or resin films subjected to release treatment. For example, a mounting paper coated with polyethylene or a silicone may be employed.

Mark Forming Method

The mark forming method of the invention is a mark forming method to transfer a pattern formed with sublimating dye onto the mark-fabric material in order to form the mark, and the mark forming method includes a pattern forming process that sublimation transfers, by heating, the pattern formed of the sublimating dye onto the mark-fabric material. The mark-fabric material includes at least, in the following sequence, the mark-fabric employing the microfibers, the adhesive layer including the thermoplastic resin having a melt flow rate of 100 g/10 min or less, and the release sheet. In the pattern forming process, the pattern formed of the sublimating dye is sublimation transferred to the mark-fabric front face of the mark-fabric material under sublimation conditions of from 185° C. to 210° C. and from 30 seconds to 90 seconds. The mark forming method of the invention may include a cutting process in which the mark-fabric material is cut to a desired shape if necessary.

Pattern Forming Method

The mark forming method of the invention is a process in which the pattern formed of the sublimating dye is sublimation transferred onto the mark-fabric front face of the mark-fabric material. The sublimating dye is a dye exhibiting characteristics of dying by molecular bonding to a polymer when heated. Sublimating dyes are generally employed in a mixture with an additive such as a dispersion stabilizer. The sublimating dye employed in the invention is not particularly limited, and a commercially available sublimating dye may be suitably selected and employed therefor. A sublimating dye that sublimates at 220° C. or less is preferably employed in consideration of points such as production cost and the softening temperature of polyesters preferably employed as the mark-fabric.

The pattern forming of the mark forming method of the invention is performed by transferring the sublimating dye to the mark-fabric front face. For the transfer sheet employed in the sublimation transfer, a printed sublimation transfer sheet with a pattern of a design etc. formed by the sublimating dye on a known transfer paper or the like may be selected and employed as appropriate.

Mark-Fabric Material

The mark-fabric material employed in the mark forming method of the invention includes, in the following sequence, the mark-fabric including the microfibers, the adhesive layer including the thermoplastic resin having a melt flow rate of 100 g/10 min or less, and the release sheet. The mark-fabric material employed in the mark forming method of the invention has a layered configuration similar to the mark-fabric material of the invention described above. The mark-fabric and the release sheet in this case are similar to as described above, and explanation is therefore omitted thereof.

The adhesive layer of the mark-fabric material employed in the mark forming method of the invention is preferably a thermoplastic resin with a softening temperature lower than the sublimation temperature of the sublimating dye and a melt flow rate of 100 g/10 min or less. Provided that the thermoplastic resin that forms the adhesive layer has a softening temperature lower than the sublimation temperature of the sublimating dye, and a melt flow rate of 100 g/10 min or less, the thermoplastic resin may be suitably selected from amongst conventional thermoplastic resins and the like as appropriate to the desired purpose. Examples of the thermoplastic resin include thermoplastic polyurethanes and the like adjusted such that the softening temperature and the viscosity thereof fulfill the above conditions. In cases in which the sublimation temperature of the sublimating dye is, for example, from 185° C. to 210° C., preferably a similar adhesive layer is formed using a similar thermoplastic resin to the resin employed in the adhesive layer in the mark-fabric material of the invention as described above.

Pattern transfer to the mark-fabric front face of the mark-fabric material may be performed by superimposing a transfer sheet, having a pattern formed of the sublimating dye, on the mark-fabric material such that the pattern formed of the sublimating dye is in contact with the mark-fabric front face, and heating and pressing using a hot press or the like. Sublimation transfer is performed at this time under sublimation conditions of from 185° C. to 210° C. and from 30 seconds to 90 seconds. The sublimation conditions are preferably from 185° C. to 200° C. and from 40 seconds to 80 seconds, and are particularly preferably from 185° C. to 195° C. and from 50 seconds to 70 seconds. The pressure during the sublimation transfer is preferably from approximately 1 g/cm² to approximately 300 g/cm². Performing sublimation transfer processing in this manner enables the pattern to be formed on the front face of the mark-fabric material using the sublimating dye.

Specific explanation follows regarding the mark-fabric material of the invention, using the drawings.

A mark-fabric material 20 of the invention is composed with the configuration illustrated in FIG. 1. The mark-fabric material 20 in FIG. 1 is configured from a mark-fabric 21, an adhesive layer 22, and a release sheet 23. As described above, a plain white cloth made from 100% polyester microfibers having affinity with the sublimating dye may be employed as the cloth of the mark-fabric 21 configuring the mark-fabric material 20 of the invention.

The adhesive layer 22 is configured on the back face of the mark-fabric 21 using a hot melt-type thermoplastic synthetic resin. The adhesive layer 22 may be formed by coating a solution of such a thermoplastic synthetic resin, or laminating a film of such a thermoplastic synthetic resin, onto the back face of the mark-fabric 21. A thermoplastic resin having a melt flow rate of 100 g/10 min or less is employed as the thermoplastic resin configuring the corresponding adhesive layer 22. A thermoplastic polyurethane or the like adjusted such that the softening temperature and the viscosity thereof fulfill the above conditions may be employed as such a thermoplastic resin. Moreover, sticking the release sheet 23 to the back face of the adhesive layer is performed according to a commonly used method. A laminating method may be used to stick the release sheet 23 to the adhesive layer 22. The conditions for performing such lamination may, for example, be conditions of a temperature of from approximately 110° C. to approximately 140° C. and a pressure of from 1 g/cm² to 150 g/m², for from 5 seconds to 30 seconds. Note the conditions for performing lamination during release sheet sticking are preferably conditions at a temperature of approximately 115° C. from the viewpoint of improving adhesion strength to the uniform after mark forming.

In order to achieve a marked-fabric in which the desired color, motif, or design is formed on the mark-fabric 21 made from the cloth configuring the mark-fabric material 20, the print face of the transfer paper, printed with the desired color, motif, or design using the sublimating dye, is superimposed on the plain white cloth of the mark-fabric 21 of the mark-fabric material 20, and heat pressing is performed under conditions of, for example, a temperature of approximately 200° C., pressure of approximately 300 g/cm², and a time of approximately 60 seconds. The sublimating dye employed in printing from the transfer paper is transferred as the desired color, motif, or design by this operation to the mark-fabric 21 that is the plain white cloth, and the color, motif, or design is formed by the sublimating dye on the plain white cloth mark-fabric 21 face.

During this operation, the adhesive layer 22 formed by the thermoplastic synthetic resin having a melt flow rate of 100 g/10 min or less is melted between the mark-fabric 21 and the release sheet 23 by the heat press operation. However, the melted synthetic resin that is a constituent component of the adhesive layer 22 does not seep out of the mark-fabric 21 since the mark-fabric 21 of the plain white cloth that is the material configuring the mark-fabric material 20 of the invention is configured by the microfibers. There is also no seepage out from the release paper. The quality problems of hitherto are accordingly not present.

Figure 2:
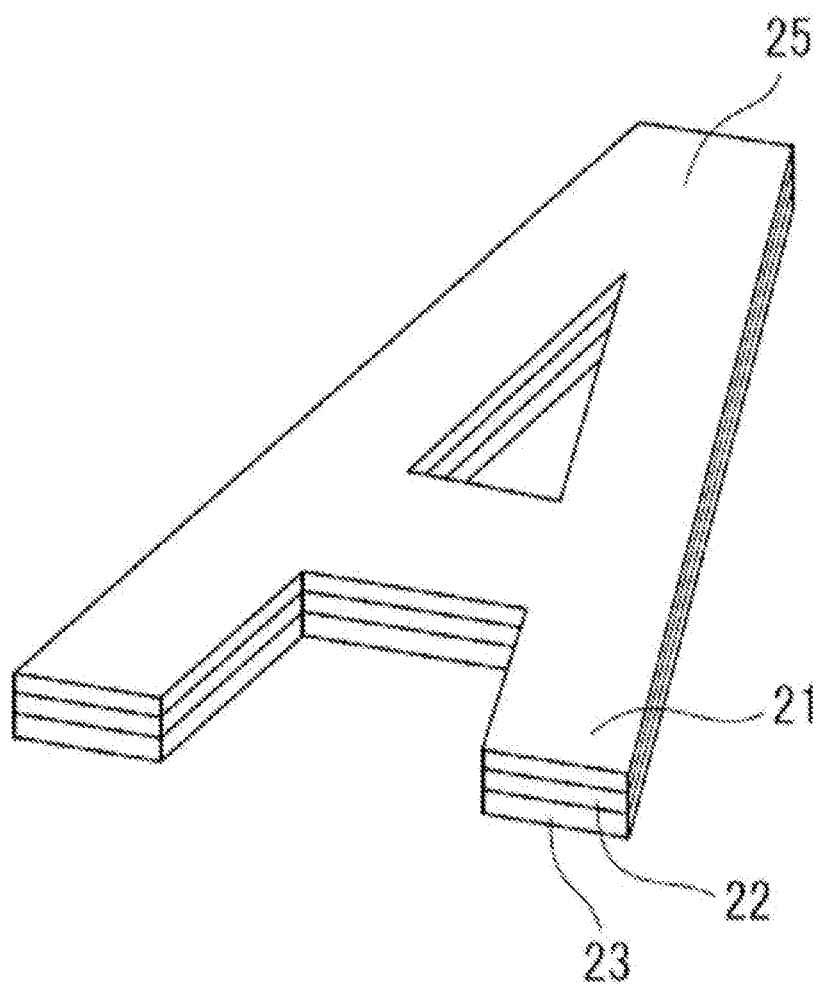
FIG. 2 is a perspective view of a mark produced from a mark-fabric material according to the invention.
Figure 3:
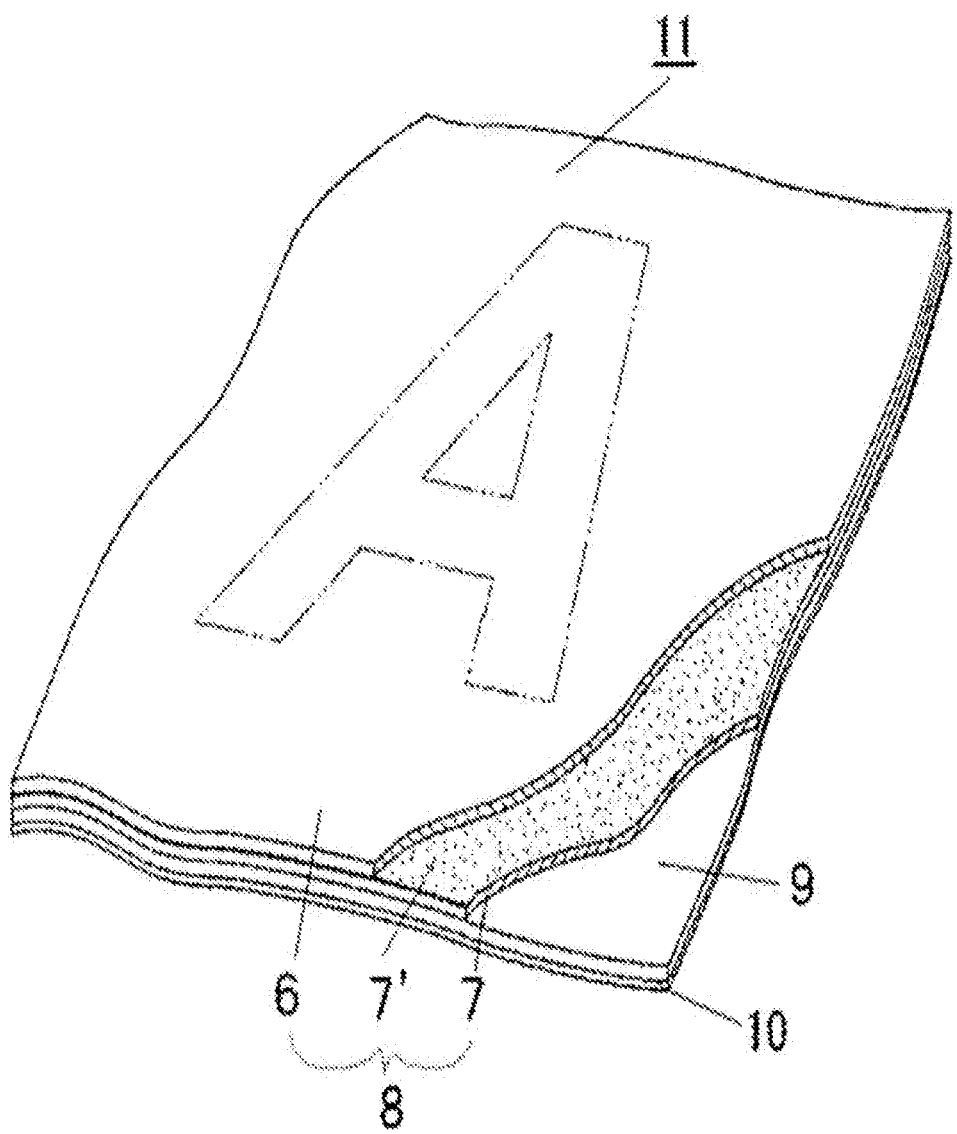
FIG. 3 is a partially cut-away perspective view of a conventional type of mark-fabric material produced using a composite fabric.
Figure 4:
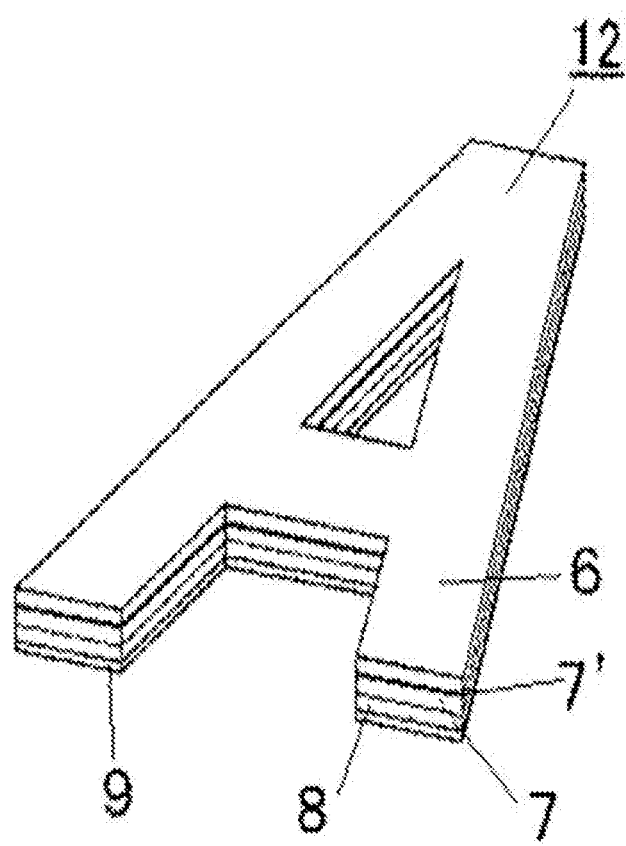
FIG. 4 is a perspective view of a mark produced from the conventional type of mark-fabric material.

Namely, provided that the mark-fabric material 20 is obtained, a producer may use transfer paper on which the desired color, motif, or design is printed with the sublimating dye, and create a marked-fabric transferred with the desired color, motif, or design using an existing heat press. Obviously the means by which the producer creates the mark from the marked-fabric is to cut to the desired shape using a conventional method to give the mark 25 illustrated in FIG. 2. Obviously the means to adhere the mark 25 to a uniform or the like is a conventional method.

EXAMPLES

The invention is specifically explained by way of examples below.

Example 1

A mark-fabric was produced using microfiber A listed in Table 1 below, an adhesive layer of thickness 90 μm formed by coating the back face of the mark-fabric with a thermoplastic polyurethane A listed in Table 2 below, and then producing a 10 cm×10 cm mark-fabric material A by laminating a release sheet (glassine paper, product number WG, manufactured by Lintec Corporation) under the lamination conditions listed in Table 3 below. In Table 1 below, the average fiber diameter is the average value when fiber diameters are measured at twenty randomly chosen locations in images of the mark-fabric front face captured at a magnification of ×500 using a scanning electron microscope. A PREX-1000 manufactured by Hariron Ltd. was employed as the press.

Types of Mark-Fabric

TABLE 1

| Type | Number | Company | Weight | Thickness | Composition | Color | Average Fiber Diameter |
|---|---|---|---|---|---|---|---|
| Microfiber A | PTD-C174 | Made by PATINDA | 180 g/ml | 430μ | 100% polyester knitted fabric | White | 10 μm |
| Microfiber B | PTD-C178 | Made by PATINDA | 150 g/ml | 350μ | 80% polyester, 20% NYLON knitted fabric | White | 10 μm |

Type of Adhesive Layer (Thermoplastic Resin)

TABLE 2

| Type | Product Number | Vicat Softening Temperature | MI Value |
|---|---|---|---|
| Thermoplastic Polyurethane A | SHM103-PUB | 90° C. | 78.71 g/10 min (190° C., 8.76 kg) |
| Thermoplastic Polyurethane B | SHM107-PUR | 80° C. | 106.39 g/10 min (190° C., 8.76 kg) |

Product name: SHM103-PUB melt flow rate (MI value) (load: 8760 g): 0.7 (125° C.), 18.89 (160° C.), 78.71 (190° C.) (units: g/10 min)
Product name: SHM107-PUR melt flow rate (MI value) (weight: 8760 g): 5.3 (125° C.), 22.68 (160° C.), 106.39 (190° C.) (units: g/10 min)

Seepage Evaluation

Sublimation transfer processing was performed onto the obtained mark-fabric material A with a heat press using a release paper-configured sublimation transfer sheet printed with a sublimating dye pattern using a sublimation printer. The sublimation transfer conditions during this processing were a temperature of 185° C., pressure of 300 g/cm², and a time of 60 seconds. When the release paper of the sublimation transfer sheet was peeled off from the mark-fabric material after the sublimation transfer processing, excellent peeling was achieved without adhesion between the mark-fabric and the release paper. Moreover, on inspection of the pattern-formed mark-fabric front face, excellent reproducibility of the pattern from the sublimating dye was achieved without noticing any resin seepage. Four colors (black, magenta, yellow, and cyan) of DIGISTAR DES ELITE (trade name) manufactured by Kiian SpA were employed in the sublimation transfer sheet. The sublimation temperatures vary for each color, and were from 180° C. to 210° C.

Peel Test

In accordance with ASTMD 903, 180° peel tests were performed using the pattern-formed mark-fabric material A. The adhesion conditions were a temperature of 150° C., pressure of 200 g/cm², and a time of 30 seconds. The same test was performed three times and the average value thereof was taken as the result.

Fastness to Washing

The release paper was peeled from the mark-fabric material formed with the pattern, and the mark was stuck onto a commercially available polyester-made uniform under adhesion conditions (pressing conditions) of a temperature of 165° C. and a pressure of 300 g/cm², for 30 seconds. A 45 minute wash-rinse-dry cycle process was then repeated 50 times using a household washing machine, and on inspection of the state of color loss and peeling off of the mark, no peeling or discoloration was noticed, and also no peeling was noticed even at the edges of the mark.

TABLE 3

| | | | |
|---|---|---|---|
| Lamination Conditions | Temperature: 130° C. | Pressure: 150 g/cm² | Time: 10 Seconds |
| Sublimation Conditions | Temperature: 185° C. | Pressure: 300 g/cm² | Time: 60 Seconds |
| Pressing Conditions | Temperature: 165° C. | Pressure: 300 g/cm² | Time: 30 Seconds |

Example 2

Mark-fabric material B was prepared similarly to in Example 1, except in that microfiber B was employed as the mark-fabric in place of microfiber A, and similar evaluation was performed. The results are listed in Table 4 below. As is apparent from Table 4, the results for the mark-fabric material B of Example 2, employing 80% polyester to 20% NYLON knitted fabric with a weight of 150 g/m² and a thickness of 330 μm as the mark-fabric were slightly inferior to Example 1 with regards to the peel test, the wash test, and the state at sublimation transfer.

Comparative Example 1

Mark-fabric material C was prepared similarly to in Example 1, except in that thermoplastic polyurethane B was employed in place of thermoplastic polyurethane A, and similar evaluation was performed. The results are listed in Table 4 below. As is apparent from Table 4, all of the results for the mark-fabric material C of Comparative Example 1, in which the thermoplastic polyurethane B having an MI value exceeding 100 g/10 min at 190° C. was employed as the adhesive layer, were clearly inferior to Example 1 with regards to the peel test, the wash test, and the state at sublimation transfer.

Comparative Example 2

Mark-fabric material D was prepared similarly to in Example 1, except in that a polyester cloth (polyester fibers (100% polyester), white satin-weave cloth, manufactured by Houlaisha Co. Ltd.; 75 denier, thickness 350 μm) was employed as the mark-fabric in place of microfiber A, and similar evaluation was performed. The results are listed in Table 4 below. As is apparent from Table 4, all of the results for the mark-fabric material D of Comparative Example 2, in which a non-microfiber polyester cloth was employed as the mark-fabric, were clearly inferior to Example 1 with regards to the peel test, the wash test, and the state at sublimation transfer. Note that the average fiber diameter of the fibers employed in the polyester cloth was estimated to be approximately 100 μm, and the polyester cloth employed in Comparative Example 2 is therefore clearly a fabric different from microfibers.

Example 3

Similar evaluation was performed to in Example 1, except in that the temperature in sublimation conditions was changed from 185° C. to 200° C. The results are listed in Table 4 below. As is apparent from Table 4, when the temperature condition at sublimation transfer is changed to 200° C., favorable results were obtained for all of the results with regards to the peel test, the wash test, and the state at sublimation transfer, however the result of the peel test was slightly inferior to that of Example 1.

TABLE 4

|  | Peel Test | Wash Test | Condition at Sublimation Transfer |
| --- | --- | --- | --- |
| Example 1 | 5.96 gkf | No peeling. No discoloration. | No hot melt seepage. Excellent sublimation reproducibility. |
| Example 2 | 1.43 kgf | Some peeling was noticed. Some discoloration was noticed. | Slight hot melt seepage noticed. Excellent sublimation reproducibility. |
| Comparative Example 1 | 1.19 kgf | Peeling | Hot melt seepage |
| Comparative Example 2 | 0.90 kgf | Peeling | Hot melt seepage. Some breakdown in sublimation transfer. |
| Example 3 | 3.94 kgf | No peeling. No discoloration. | No hot melt seepage. Excellent sublimation reproducibility. |

Reference Example 1

This was similar to Example 1 except in that the temperature of the sublimation conditions was changed from 185° C. to 180° C., and only the wash test was performed. As a result of changing the temperature condition at sublimation transfer to 180° C., although sublimation transfer occurred to some extent, the color in the transfer image was faint, and the sublimation reproducibility was inferior in comparison with Example 1. Moreover, in contrast to the results of Example 1, discoloration due to washing was noticed.

Reference Example 2

This was similar to Example 1 except in that the temperature of the sublimation conditions was changed from 185° C. to 210° C., and only the wash test was performed. As a result of changing the temperature condition at sublimation transfer to 210° C., color splash and discoloration occurred during sublimation transfer, and the sublimation reproducibility was inferior in comparison with Example 1. Moreover, slight seepage of the adhesive layer to the mark-fabric front face was noticed. Slight yellowing was also noticed at plain white cloth portions where the mark-fabric had shrunk during the sublimation transfer.

The disclosure of Japanese Patent Application No. 2012-137752 is incorporated into the present specification by reference.

The invention claimed is:

1. A mark-fabric material, comprising, in the following sequence:
   a mark-fabric comprising microfibers having a fiber diameter of 10 μm or less;
   an adhesive layer including a thermoplastic resin having a melt flow rate of 100 g/10 min or less; and
   a release sheet.

2. The mark-fabric material of claim 1, wherein the microfibers comprise polyester.

3. The mark-fabric material of claim 1, wherein the mark-fabric is a 100% polyester woven fabric, knitted fabric, or non-woven fabric.

4. The mark-fabric material of claim 1, wherein the weight of the mark-fabric is from 100 g/m$^2$ to 250 g/m$^2$.

5. The mark-fabric material of claim 1, wherein the mark-fabric is a white color.

6. A mark forming method, comprising:
   forming a pattern with a sublimating dye on a mark-fabric material including, in the following sequence, a mark-fabric comprising microfibers having a fiber diameter of 10 μm or less, an adhesive layer including a thermoplastic resin having a melt flow rate of 100 g/10 min or less, and a release sheet, by sublimation transfer using sublimation conditions of from 185° C. to 210° C. and from 30 seconds to 90 seconds.

7. The mark forming method of claim 6, wherein the microfibers comprise polyester.

8. The mark forming method of claim 6, wherein the mark-fabric is a 100% polyester woven fabric, knitted fabric, or non-woven fabric.

9. The mark forming method of claim 6, wherein the weight of the mark-fabric is from 100 g/m$^2$ to 250 g/m$^2$.

10. The mark forming method of claim 6, wherein the mark-fabric is a white color.

11. The mark-fabric material of claim 1, wherein:
    the microfibers comprise polyester; and
    the mark-fabric is a 100% polyester woven fabric, knitted fabric, or non-woven fabric.

12. The mark-fabric material of claim 1, wherein:
    the microfibers comprise polyester;
    the mark-fabric is a 100% polyester woven fabric, knitted fabric, or non-woven fabric; and
    the weight of the mark-fabric is from 100 g/m$^2$ to 250 g/m$^2$.

13. The mark-fabric material of claim 1, wherein:
    the microfibers comprise polyester;
    the mark-fabric is a 100% polyester woven fabric, knitted fabric, or non-woven fabric;
    the weight of the mark-fabric is from 100 g/m$^2$ to 250 g/m$^2$; and
    the mark-fabric is a white color.

14. The mark-forming method of claim 6, wherein:
    the microfibers comprise polyester; and
    the mark-fabric is a 100% polyester woven fabric, knitted fabric, or non-woven fabric.

15. The mark-forming method of claim 6, wherein:
    the microfibers comprise polyester;
    the mark-fabric is a 100% polyester woven fabric, knitted fabric, or non-woven fabric; and the weight of the mark-fabric is from 100 g/m² to 250 g/m².

16. The mark-forming method of claim 6, wherein:
the microfibers comprise polyester;
the mark-fabric is a 100% polyester woven fabric, knitted fabric, or non-woven fabric;
the weight of the mark-fabric is from 100 g/m² to 250 g/m²; and
the mark-fabric is a white color.

17. The mark-fabric material of claim 1, wherein the adhesive layer directly contacts the mark-fabric.

18. The mark-forming method of claim 6, wherein the adhesive layer directly contacts the mark-fabric.

* * * * *